(12) United States Patent
Chandi et al.

(10) Patent No.: US 9,037,963 B1
(45) Date of Patent: May 19, 2015

(54) SECURE CROSS-DOMAIN WEB BROWSER COMMUNICATIONS

(75) Inventors: Hendi Chandi, Jakarta (ID); Ashish Agrawal, Seattle, WA (US); Dhanvi H. Kapila, Seattle, WA (US); Vineesh Sinha, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 169 days.

(21) Appl. No.: 13/092,695

(22) Filed: Apr. 22, 2011

(51) Int. Cl.
*G06F 17/00* (2006.01)
*G06F 17/30* (2006.01)

(52) U.S. Cl.
CPC .......... *G06F 17/00* (2013.01); *G06F 17/30861* (2013.01)

(58) Field of Classification Search
CPC ............................ G06F 17/00; G06F 17/30861
USPC .................................................. 715/234, 240
See application file for complete search history.

(56) References Cited

U.S. PATENT DOCUMENTS

| | | |
|---|---|---|
| 5,715,314 A | 2/1998 | Payne et al. |
| 5,815,665 A | 9/1998 | Teper et al. |
| 5,890,137 A | 3/1999 | Koreeda |
| 5,903,652 A | 5/1999 | Mital |
| 5,903,721 A | 5/1999 | Sixtus |
| 5,903,878 A | 5/1999 | Talati et al. |
| 5,956,483 A | 9/1999 | Grate et al. |
| 6,005,939 A | 12/1999 | Fortenberry et al. |
| 6,070,142 A | 5/2000 | McDonough et al. |
| 6,078,902 A | 6/2000 | Schenkler |
| 6,092,053 A | 7/2000 | Boesch et al. |
| 6,275,824 B1 | 8/2001 | O'Flaherty et al. |
| 6,327,578 B1 | 12/2001 | Linehan |
| 6,332,134 B1 | 12/2001 | Foster |
| 6,601,761 B1 | 8/2003 | Katis |
| 6,957,334 B1 | 10/2005 | Goldstein et al. |
| 7,194,437 B1 | 3/2007 | Britto et al. |
| 7,685,067 B1 | 3/2010 | Britto et al. |
| 7,877,299 B2 | 1/2011 | Bui |

(Continued)

FOREIGN PATENT DOCUMENTS

| | | |
|---|---|---|
| EP | 0793203 A3 | 9/1997 |
| EP | 1168264 A2 | 1/2002 |

OTHER PUBLICATIONS postMessage Method, downloaded Oct. 14, 2011 from http://msdn.microsoft.com/en-us/library/cc197015(d=printer, v-vs.85).aspx, 4 pp.

(Continued)

*Primary Examiner* — Stephen Hong
*Assistant Examiner* — Marshon Robinson
(74) *Attorney, Agent, or Firm* — Knobbe, Martens, Olson & Bear, LLP

(57) ABSTRACT

Methods, systems and computer program products are provided in which a first "sender" web browser window that is within a first domain can communicate with a second "target" web browser window that is within a second, different domain. Pursuant to these techniques, an iframe may be provided within the target web browser window that has a source address that is within the first domain. The content of the iframe may be a function that forwards a received message to the target web browser window. The target web browser window may receive a message in response to the sender web browser window invoking the function of the iframe.

27 Claims, 9 Drawing Sheets

(56) References Cited

U.S. PATENT DOCUMENTS

| | | | |
|---|---|---|---|
| 7,966,259 B1 | 6/2011 | Bui | |
| 7,975,019 B1 | 7/2011 | Green et al. | |
| 7,979,791 B2* | 7/2011 | Yang et al. | 715/234 |
| 8,103,742 B1 | 1/2012 | Green | |
| 8,108,771 B2 | 1/2012 | Chijiwa et al. | |
| 8,160,935 B2 | 4/2012 | Bui | |
| 8,250,082 B2* | 8/2012 | Gwozdz et al. | 707/756 |
| 8,355,959 B2 | 1/2013 | Bui | |
| 8,365,061 B1* | 1/2013 | Bloom et al. | 715/205 |
| 8,386,784 B2 | 2/2013 | Gao et al. | |
| 8,423,615 B1* | 4/2013 | Hayes | 709/206 |
| 8,626,665 B2 | 1/2014 | Bui | |
| 8,689,099 B1 | 4/2014 | Hanni et al. | |
| 2003/0037232 A1 | 2/2003 | Bailiff | |
| 2003/0163514 A1 | 8/2003 | Waldschmidt | 709/201 |
| 2004/0054898 A1 | 3/2004 | Chao et al. | |
| 2005/0114430 A1* | 5/2005 | Zheng et al. | 709/200 |
| 2005/0216421 A1 | 9/2005 | Barry et al. | |
| 2006/0015594 A1* | 1/2006 | Kontamsetty et al. | 709/221 |
| 2006/0101139 A1* | 5/2006 | Hornreich et al. | 709/224 |
| 2007/0220148 A1 | 9/2007 | Ganesan et al. | |
| 2007/0299857 A1* | 12/2007 | Gwozdz et al. | 707/102 |
| 2007/0300064 A1* | 12/2007 | Isaacs et al. | 713/168 |
| 2008/0010359 A1* | 1/2008 | Achtermann et al. | 709/217 |
| 2008/0195761 A1 | 8/2008 | Jabri et al. | |
| 2008/0281944 A1* | 11/2008 | Vorne et al. | 709/218 |
| 2009/0037806 A1* | 2/2009 | Yang et al. | 715/234 |
| 2009/0063613 A1* | 3/2009 | Chijiiwa et al. | 709/202 |
| 2009/0276835 A1* | 11/2009 | Jackson et al. | 726/4 |
| 2009/0299862 A1* | 12/2009 | Fan et al. | 705/14.73 |
| 2009/0328063 A1* | 12/2009 | Corvera et al. | 719/315 |
| 2010/0197326 A1 | 8/2010 | Ngo | |
| 2010/0198860 A1* | 8/2010 | Burnett et al. | 707/769 |
| 2010/0281107 A1* | 11/2010 | Fallows et al. | 709/203 |
| 2010/0299205 A1 | 11/2010 | Erdmann et al. | |
| 2011/0154130 A1* | 6/2011 | Helander et al. | 714/48 |
| 2011/0161990 A1* | 6/2011 | Smith et al. | 719/328 |
| 2011/0225232 A1* | 9/2011 | Casalaina et al. | 709/203 |
| 2011/0274258 A1 | 11/2011 | Casalaina et al. | |
| 2011/0274261 A1* | 11/2011 | Casalaina et al. | 379/93.23 |
| 2011/0321133 A1* | 12/2011 | Grieve | 726/4 |
| 2012/0016749 A1 | 1/2012 | Lisbakken | |
| 2012/0084641 A1* | 4/2012 | Chung et al. | 715/240 |
| 2012/0101907 A1* | 4/2012 | Dodda | 705/14.73 |
| 2012/0131448 A1* | 5/2012 | Chijiiwa et al. | 715/240 |

OTHER PUBLICATIONS

"David Walsh Blog" downloaded Mar. 11, 2011 from http://davidwalsh.name/window-postmessage, 3 pp.

9 Communication—HTML Standard, Living Standard, downloaded Mar. 11, 2011 from http://www.whatwg.org/specs/web-apps/current-work/multiplage/comms.html, 8 pp.

"postMessage in HTML5 to send messages between windows and iframes," downloaded Mar. 11, 2011 from http://robertnyman.com/2010/03/18/postmessage-in-html5-to-send-messages-between-win . . . , published Mar. 18, 2010, 11 pp.

"HTML5 Implementation Issues in IE8," downloaded Feb. 7, 2011 from http://blogs.msdn.com/b/ieinternals/archive/2009/09/16/bugs-in-ie8-support-for-html5-post . . . 3 pp.

"Communicating Between Windows," downloaded Mar. 11, 2011 from http://sharkysoft.com/tutorials/jsa/content/027.html, 3 pp.

Hanni et al., "Cross-Domain Communication", U.S. Appl. No. 12/978,116, filed Dec. 23, 2010.

U.S. Appl. No. 12/236,285.

U.S. Appl. No. 12/265,554.

U.S. Appl. No. 12/265,523.

U.S. Appl. No. 12/847,515.

U.S. Appl. No. 12/362,377.

Julien Lecomte "Introducing Cross Frame, a Safe Communication Mechanism Across Documents and Across Domains", Nov. 26, 2007, http://www.julienlecomte.net/blog/2007/11/31/.

Digital Wallets Homepage (http://www-db.stanford-edu/-daswani/wallets/. Sep. 2, 1999.

InstaBuy From Cybercash Offers Easy and Safe Buying Solution to Online Customers and Merchants—InstaBuy Press Release Aug. 19, 1998.

\* cited by examiner

SECURE CROSS-DOMAIN WEB BROWSER COMMUNICATIONS

BACKGROUND

Web browser programs are computer software applications that are designed to retrieve information over the Internet, and to then render the retrieved information on a display device where it can be accessed and reviewed by a user. A user may request information such as a web page from a remote server over the Internet by inputting an address in the form of a Uniform Resource Locator ("URL") into the web browser program, which causes the web browser program to request one or more files from the remote server that are needed to construct the web page and render it on the user's display device. The requested files are usually extensible mark-up language ("XML") or hyper-text markup language ("HTML") files. Upon receipt of the requested file(s), the web browser program renders the information (e.g., a web page, a form, a video, etc.) in an appropriate format on the user's display device, typically in the form of an XML or HTML document.

The web browser program usually displays the requested XML or HTML documents to the user within one or more windows on the user's display device. A window refers to a portion of the display device that is typically framed by borders and which presents the document(s) rendered therein in a manner that appears to be independent of the rest of the display. Windows can be divided into or include one or more "iframe" sub-elements (which sometimes are referred to as simply "frames"), each of which may operate as a separate, independently controllable sub-window that may, for example, contain its own HTML or XML document(s). The source ("src") address of an iframe identifies the source of the content of the iframe (e.g., the URL of the contents of the iframe). An iframe can be embedded in a window such that it is not visible on the user's display device. A window or iframe is considered to be "in" or "within" or "associated with" (which terms may be used interchangeably herein) the "domain" of the server or other processing device that supplied the content to the window, where the "domain" refers to a common name under which the server supplying the content and various other network devices are organized (e.g., abc.com).

Pop-up windows, dialog boxes and other windows or iframes are routinely generated on a display device that are located on top of, or adjacent to, an underlying web browser window or iframe. In certain situations, it may be desirable to allow, for example, a pop-up window or iframe to communicate with an underlying web browser window or with widgets or other objects contained within the underlying web browser window. Unfortunately, allowing a first window or iframe to alter the contents of a second window or iframe can raise security concerns, particularly if the windows/iframes at issue are not populated with information that originated from the same source. In particular, so-called cross-site scripting attacks have become increasingly common. A cross-site scripting attack refers to the malicious injection of JavaScript or other computer code into a web page that is being viewed by other users, where the code is designed to insert advertisements, steal sensitive information or commit other annoying or malicious acts. In order to combat such cross-scripting attacks, many web browser programs now restrict or prevent a window that is in a first domain from communicating with or altering the contents of windows that are in different domains, even in cases where the windows are not hostile to each other. Because of these security features, various "cross-domain" communications (i.e., where a window/iframe in a first domain communicates with a window/iframe in a second, different domain) that a web page designer may build into a window may not work properly across all web browser programs. As such, web pages may not work in their intended fashion when viewed by Internet users that employ web browser programs that place certain restrictions on cross-domain communications.

DETAILED DESCRIPTION

Methods, systems and computer program products are disclosed herein that may be used to facilitate secure cross-domain communications between web browser windows. For example, a web page or other document may be rendered within a first web browser window (herein the "target window") on a display device. The target window is in a first domain that includes the server that supplied the web page that is displayed in the target window. The target window may include an embedded iframe or window such as, for example, a pop-up window, which may be populated with information from a second domain that is different than the first domain. This pop-up window may need to communicate with the target window and/or alter content that is displayed in the target window. Unfortunately, as discussed above, security features that are included in various web browser programs may prevent the pop-up window from doing so because the two windows are in different domains.

Pursuant to the techniques disclosed herein, an iframe (referred to as a "bridge iframe") may be created, for example, when the web page supplied from the first domain is loaded within the target window. The content of this bridge iframe—which is supplied from a second, different domain—is a function called the "SendMessageToParent" function that forwards a received message to the target window. The pop-up window is a "child" of the target window, as it was opened/created by the target window. Because the pop-up window is related to the target window (i.e., in a child-parent relationship), the pop-up window can find and gain access to the bridge iframe, even though the pop-up window and the target window (which is the parent of the bridge iframe) are associated with different domains. Additionally, as the bridge iframe is within the second domain (i.e., in the same domain as the pop-up window), the pop-up window can access or "call" the above-mentioned SendMessageToParent function of the bridge iframe, where the call of the function includes a message that is to be sent to the target window. The SendMessageToParent function of the bridge iframe forwards this message to the target window using conventional techniques for iframe-to-window communications. Thus, by embedding the bridge iframe within the target window, embodiments of the present disclosure may facilitate secure cross-domain communications between windows that are in different domains.

Various embodiments will now be described in greater detail with reference to the figures.

Figure 1:
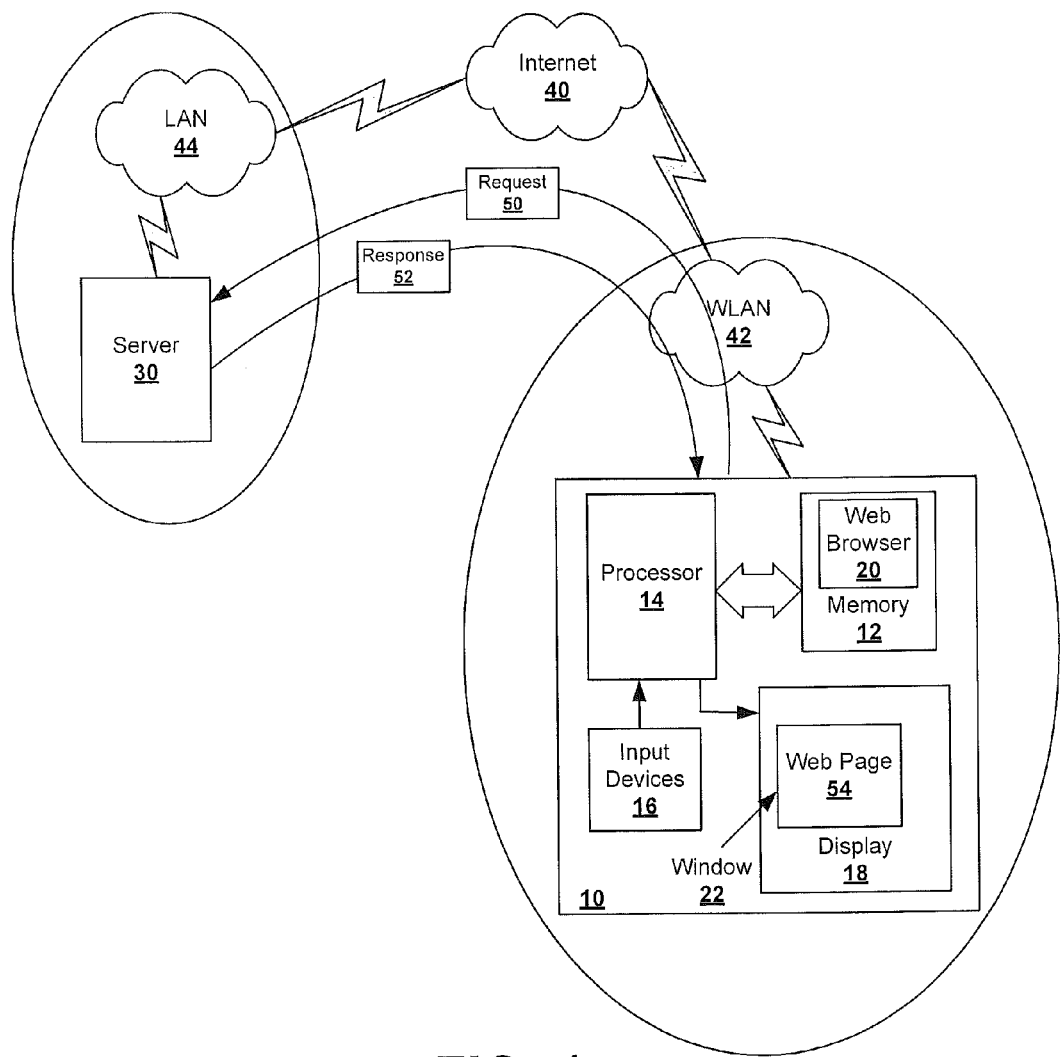
FIG. 1 is a schematic block diagram illustrating how a web browser program may retrieve a web page from a remote server and display the web page to an Internet user.

FIG. 1 is a schematic block diagram illustrating how a web browser program may retrieve a web page or other content from a remote server for display on a computer or other processing device. As shown in FIG. 1, an Internet user may have a first processing device 10 that is connected to a remote server 30 via one or more wired and/or wireless communications links. In the example of FIG. 1, the processing device 10 is connected to the remote server 30 via a series of networks that include a wireless local area network ("WLAN") 42 that connects the processing device 10 to an Internet connection, the Internet 40, and a local area network ("LAN") 44 that connects the remote server 30 to the Internet 40 and to various other associated hardware such as, for example, memory storage devices (not shown in FIG. 1).

The processing device 10 may be any suitable device that has Internet communications capabilities, such as a personal computer, laptop computer, netbook computer, tablet computer, gaming system, smart phone, music player, personal digital assistant or the like. The processing device 10 may include a memory 12, a processor 14, input devices 16 (e.g., a keyboard, mouse, microphone, etc.) and a display 18, along with numerous other components (not shown in FIG. 1) such as wired or wireless network cards, additional output devices, operating systems, input/output ports, input/output port drivers, etc. that are commonly provided on Internet-enabled processing devices. The processing device 10 further includes a web browser program 20 that is stored in the memory 12. Examples of commercially available and commonly used web browser programs 20 include Microsoft® Internet Explorer®, Google® Chrome®, Safari®, Firefox® and Opera®. The web browser program 20 may be executed on the processor 14. It will also be appreciated that the web browser program 20 may be stored and/or executed from a location remote from the processing device 10.

The web browser program 20 may be used to collect and render on the display 18 information that is stored, for example, on various remote servers such as remote server 30. In the example of FIG. 1, the remote server 30 is connected to processing device 10 via the Internet 40, a WLAN 42 and a hard-wired LAN 44. The user operating the processing device 10 may, for example, request information from remote server 30 over the Internet 40 by opening the web browser program 20. Once the web browser program 20 is opened, the user may use one or more of the input devices 16 (e.g., a mouse and a keyboard) to input a URL such as, for example, http://www.xyz.com, into an input box that is displayed to the user via display 18. The input URL acts as an electronic address that identifies to the web browser program 20 a location where, for example, a particular web page that the user wants to view may be found.

Each URL follows a defined format that includes a protocol portion, a domain name or Internet Protocol ("IP") address, an optional port number, a path (which identifies where the resource can be found), a query string (if appropriate), and an optional fragment identifier. Thus, a URL may have the following general format:

protocol://domain:port/path?query_string#fragment_id

The protocol defines the purpose of the remainder of the URL, with http, https and ftp being common protocols. The domain name (or IP address) identifies the destination location for the URL, which may be, for example, the IP address of a server that hosts the requested document. The port number, which is optional (since a default port is typically specified) identifies the port on the host server associated with the IP address to connect to. The path specifies where the requested document may be found on the host server. The query string contains data that may be passed to software running on the host server and, finally, the fragment identifier specifies a section or location within the requested document so that the web browser program may scroll to display a specific part of the document.

Once the user enters the URL into the web browser program 20, the web browser program 20 sends a request 50 over the networks 40, 42, 44 to a server or other processing device associated with the input URL (which, in the example of FIG. 1, is the remote server 30). In response to the request 50, the remote server 30 may send a response 52 back to the processing device 10 that hosts the web browser program 20. This response 52 may comprise, for example, one or more XML or HTML files that may be used by the web browser program 20 to generate or "render" a web page on the display 18 of processing device 10. A layout engine of the web browser program 20 may then transform the response 52 (e.g., the XML or HTML files) into an interactive document that may be rendered to the user on the display 18 of the processing device 10 such as, for example, a web page 54. Web pages such as web page 54 may include text, images, audio, video and embedded programs such as JavaScript applets. A web page 54 may also include JavaScript or other computer program code which may allow the user (via the web browser program 20) to interact with the server 30 that supplied the web page 54 to the user's web browser program 20. This code may, for example, change the appearance of the rendered web page, open additional web pages or iframes, execute audio or video files and the like automatically and/or in response to input received from a user.

As is well known in the art, a web page such as web page 54 is typically rendered to a user within a web browser window 22 that is created by the web browser program 20 on the display 18 of processing device 10. The web browser window 22 may comprise a single window, or may be sub-divided into (or otherwise include) multiple iframes, where each iframe may act like a sub-window and may contain its own web page, media element (e.g., video file) or the like. Pop-up windows may also be displayed by the web browser program 20. A pop-up window refers to a second, typically smaller web browser window that may be partially or completely superimposed over (or under with respect to "pop-under" windows) an "initial" web browser window. Pop-up windows are routinely used to present advertisements or other information to a user. Pop-up windows can be an effective means for displaying information to the user because they typically are designed so that they do not disrupt the underlying web browser window. By way of example, a user who is filling out a form on a web page and needs additional guidance may select a "help" utility that renders a pop-up window that appears over the underlying window and next to the form that provides more detailed instructions for completing the form. This allows the user to access the more detailed instructions without reloading the underlying web page (which reload might result in the loss of some of the data entered into the form and/or cause the user to lose their place on a long web page), and can also be used to reduce the amount of data transmitted for web page navigation, thereby improving user access speeds.

Figure 2:
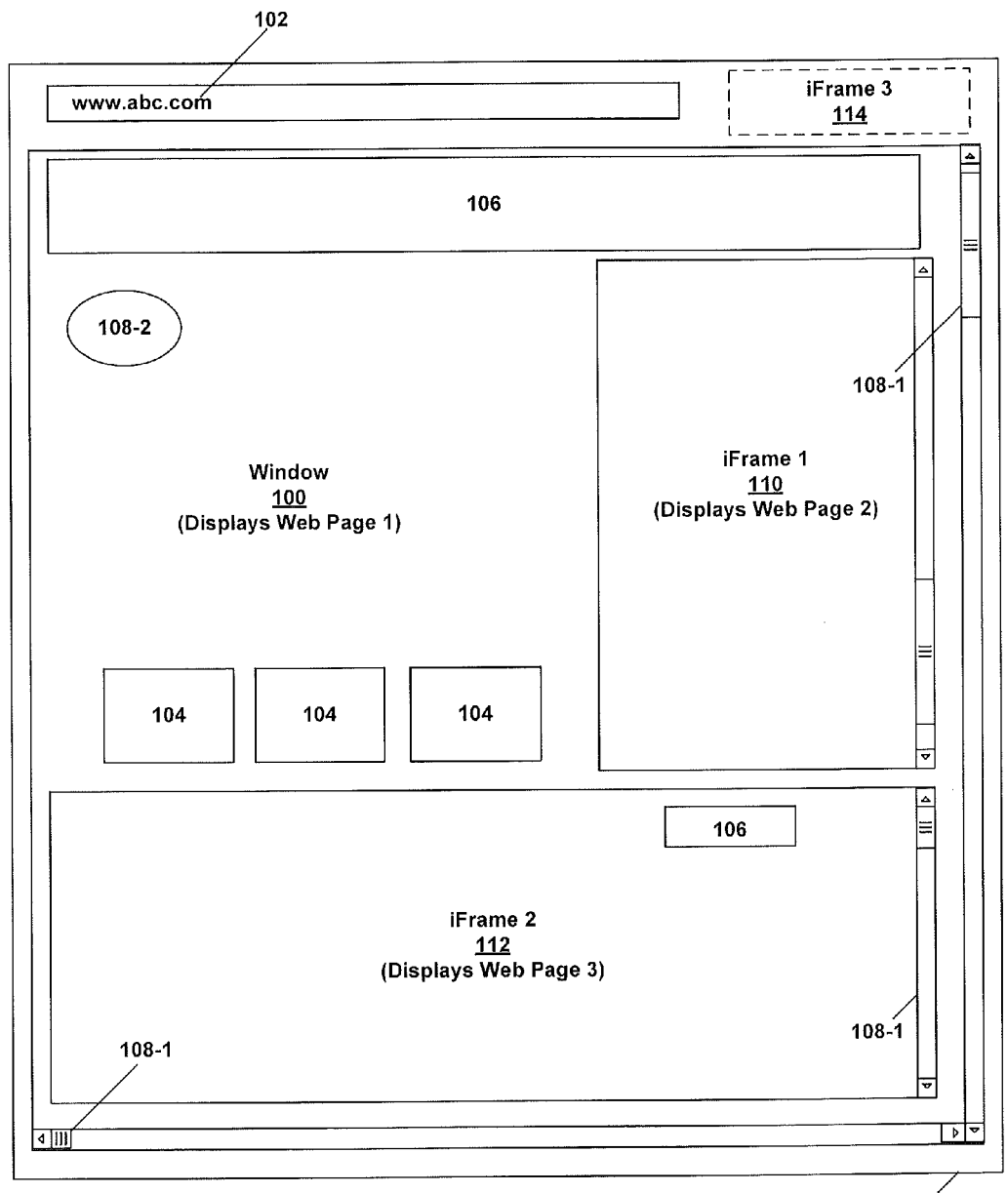
FIG. 2 is a schematic diagram illustrating a web browser window having multiple iframes embedded therein that display web pages and other elements to a user.

FIG. 2 is a schematic diagram that illustrates typical content that may be displayed in a web browser window 100 that is rendered to a user within display 18 of processing device 10. The web browser window 100 may have its own unique URL 102, which may or may not be displayed to the user. A variety of objects may be embedded within the window 100. These objects may include, for example, media elements such as videos 104, banner advertisements 106, widgets 108 and/or a variety of other objects known to those of skill in the art. A widget is an element of a graphical user interface that displays information or provides a specific way for a user to interact with a computer program such as an application or an operating system. Exemplary widgets include icons, pull-down menus, user-selectable buttons and/or boxes, progress indicators, scroll bars that allow a user to scroll horizontally or vertically to view content that does not fit on their display, window edges that allow a user to resize the window, toggle buttons, forms, and the like which display information and/or which invite, accept and/or respond to actions by a user. In FIG. 2, several example widgets 108 are illustrated including scroll bars 108-1 and a button 108-2. The window 100 may also include embedded JavaScript (not shown) that may carry out a variety of functions, including sending communications to other windows or iframes and/or receiving communications from other windows or iframes.

As shown in FIG. 2, the window 100 may be divided into or otherwise include a plurality of iframes 110, 112, 114. Each iframe 110, 112, 114 may, in effect, comprise a separate sub-window that may have the full functionality of a window, including a separate URL, the ability to scroll independently of other displayed windows, the ability to reload independent of other displayed windows, etc. Each iframe 110, 112, 114 is a "child" of the window 100, and the window 100 comprises a "parent" of the iframes 110, 112, 114. As is shown by the dotted line outlining iframe 114 in FIG. 2, some iframes may be embedded within window 100 but not be visible to a user. In some cases (not shown), the window 100 may not be visible to a user, who will only see the individual iframes 110, 112. As shown in FIG. 2, the window and the iframes 110, 112 may each comprise a container that holds one or more things such as a web page, a media element, an advertisement or the like. In the example of FIG. 2, a total of three web pages having distinct URLs are simultaneously displayed to the user in window 100 and iframes 110 and 112.

Thus, as shown in FIG. 2, a plurality of different web pages, media elements, advertisements and the like—some of which are independently controllable and some of which are not—may be simultaneously displayed to a user within a web browser window 100 and its associated iframes 110, 112.

There may be instances where a first entity has one or more widgets that are rendered on a web page that is controlled and operated by a second, different entity. As one simple example, the first entity may pay the second entity to include widgets on certain of its web pages that, when selected by a user viewing the web page, activate a pop-up window within the web browser window that includes, for example, a web page, form or other content provided by the second entity. This example is illustrated in FIG. 3.

Figure 3:
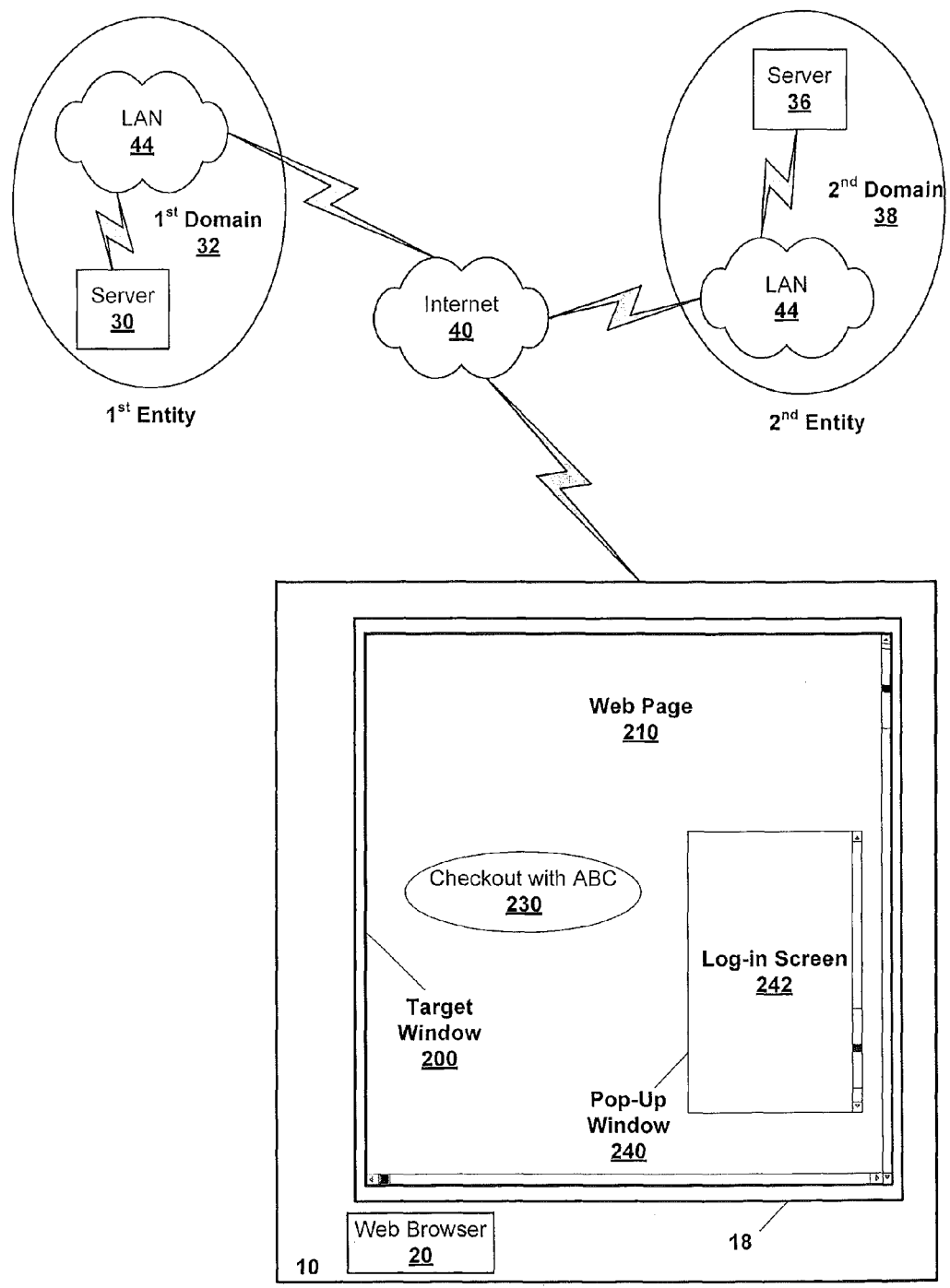
FIG. 3 is a schematic diagram of a web browser window which contains a web page that is controlled by a first entity that illustrates an exemplary situation where a second entity may want to have the ability to interactively modify certain content on the web page.

In particular, FIG. 3 illustrates a web browser window 200 ("the target window") which is provided on the display 18 of a processing device 10. A web page 210 is rendered within the target window 200. The files necessary to create web page 210 were provided to the web browser program 20 running on processing device 10 by a first remote server 30 that is run by the first entity. The first server 30 is part of a first domain 32. The rendered web page 210 may, for example, comprise a "check-out" web page of an online merchant which initiates the process of collecting information from the user that is necessary to complete a purchase transaction. The web page 210 includes a widget 230 thereon in the form of a button. In this example, the widget/button 230 allows a user who is completing an online purchase of an item from the first entity to pay for that purchase via an account that the user has with a second entity. This second entity operates a second remote server 36 that is in a second, different domain 38.

A user that is viewing the web page 210 may "activate" the button 230 (e.g., by pointing to it using a mouse and then clicking on the button 230, pressing the button 230 when the web page 200 is displayed on a touch screen, etc.) to cause JavaScript code that is associated with the widget/button 230 to be executed that causes the web browser program 20 to, for example, create and populate a pop-up window 240 on the user's display 18. This pop-up window 240 may be located adjacent to the target window 200 and/or partially or completely overlapping the target window 200. The content displayed in the pop-up window 240 may be a web page, a form, etc. that is supplied by the second server 36 that is in the second domain 38. By way of example, the content displayed in the pop-up window 240 may be an interactive log-in screen 242 that the user can fill in to log into an account that the user has with the second entity.

There may be reasons for communicating information from the pop-up window 240 back to the target window 200. As one simple example, the user may enter address information into the pop-up window 240 as part of the payment process. It may be desirable to communicate this address information back to the target window 200. As another example, it may be desirable for the pop-up window 240 to close the target window 200 (or an iframe thereof) at some point during the payment process. In order to accomplish these tasks, it is necessary to have a means for the pop-up window 240 to communicate with the target window 200.

Figure 4:
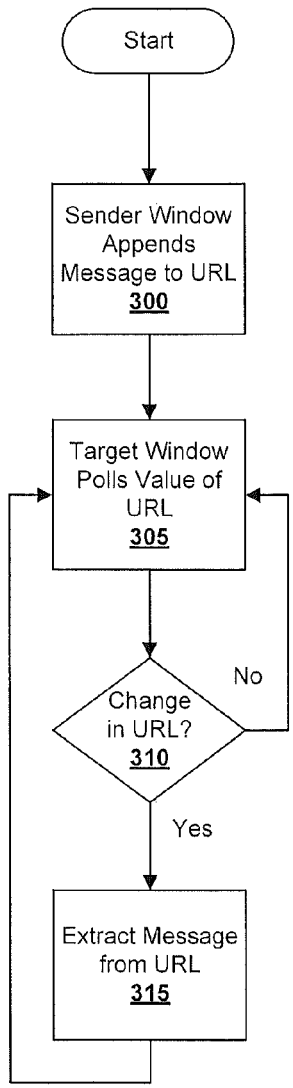
FIG. 4 is a flow chart that illustrates a method for implementing communications between windows that is known as the URL polling technique.

FIG. 4 is a flow chart that illustrates one conventional method for implementing cross-domain communications between two windows that is known as the URL polling technique. As shown in FIG. 4, with this technique, a first window (e.g., the pop window 240 of FIG. 3) can send a message to a second window (e.g., the target window 200 of FIG. 3) by appending the communication to the URL fragment identifier (hash location) of the second window (block 300). The second window 200 periodically polls the value of its URL to detect if any changes have been made thereto (block 305). If at block 310 the second window 200 detects a change to its URL, operations proceed to block 315 where the second window 200 extracts the message that has been appended to URL. If the URL remains unchanged, the periodic polling of the URL at block 305 continues. This "URL polling" method provides a simple mechanism for a first window or iframe to send messages to a second window or iframe, even though the windows/iframes may belong to different domains. While this technique still works with, for example, the FireFox web browser program, most other major web browsers have installed security routines that prevent an iframe or window associated with a first domain from tampering with the URL of an iframe or window that is associated with a different second domain. Consequently, if the pop-up window 240 of FIG. 3 is associated with a different domain than the target window 200, then most web browser programs will no longer allow the pop-up window 240 to use the URL polling technique to send a message to the target window 200.

Figure 5:
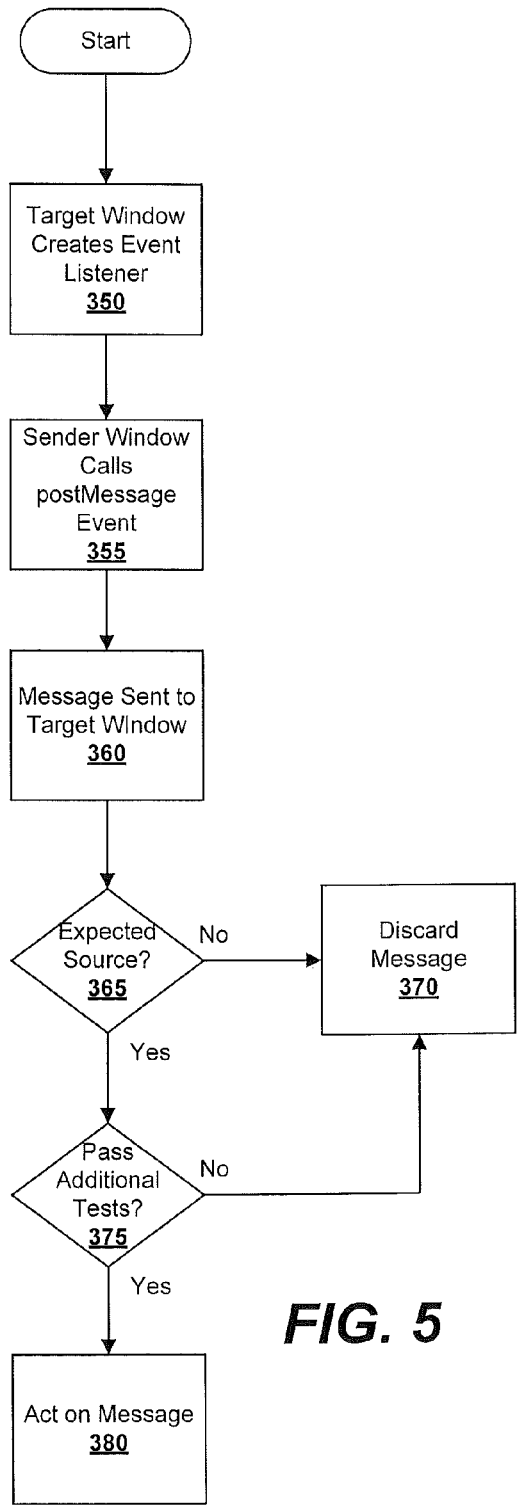
FIG. 5 is a flowchart that illustrates another method for implementing communications between windows that is known as the postMessage technique.

FIG. 5 is a flow chart that illustrates another conventional method for implementing cross-domain communications between windows that is known as the postMessage technique. The postMessage technique became available with the implementation of HTML 5 standard. As shown in FIG. 5, under the postMessage technique, operations for a cross-domain communication may begin by JavaScript in the window that is to receive the cross-domain communication (e.g., the target window 200 of FIG. 3) creating an event handler such as, for example, an event listener that listens for incoming messages (block 350). An event listener is a software element that distributes data to objects that register to receive the data corresponding, for example, to the detection of specific events from specific sources. Next, JavaScript in a "sending" window (e.g., the pop-up window 240 of FIG. 3) calls a "postMessage" event on the target window 200 (block 355). This postMessage call causes a message event to be sent to the target window 200 that is marked as originating from the document rendered in the pop-up window 240 (block 360). When the message is received at the target window 200, JavaScript in the target window 200 (which may be the event listener) checks the source domain of the message to confirm that the message is from an expected source domain (block 365). If it is not, the message may be discarded (block 370). If the message is from an expected source domain, JavaScript (e.g., the event listener) in the target window may (optionally) perform additional security checks, such as, for example, confirming that data contained in the received message has an expected format (block 375). If it does not, the message may be discarded (block 370). If the received message passes these additional security checks, then the communication may be passed to the target window 200 and/or allowed to alter the target window 200 (block 380).

Unfortunately, not all web browser programs support postMessage calls for cross-domain window-to-window communications. Consequently, in the example of FIG. 3 above where a window that is associated with a first domain is seeking to communicate with a window that is associated with a second domain, the postMessage technique will not work for all web browser programs. Consequently, neither the postMessage technique nor the URL polling technique will work across all major web browser programs as a technique for implementing cross-domain window-to-window communications.

Figure 6:
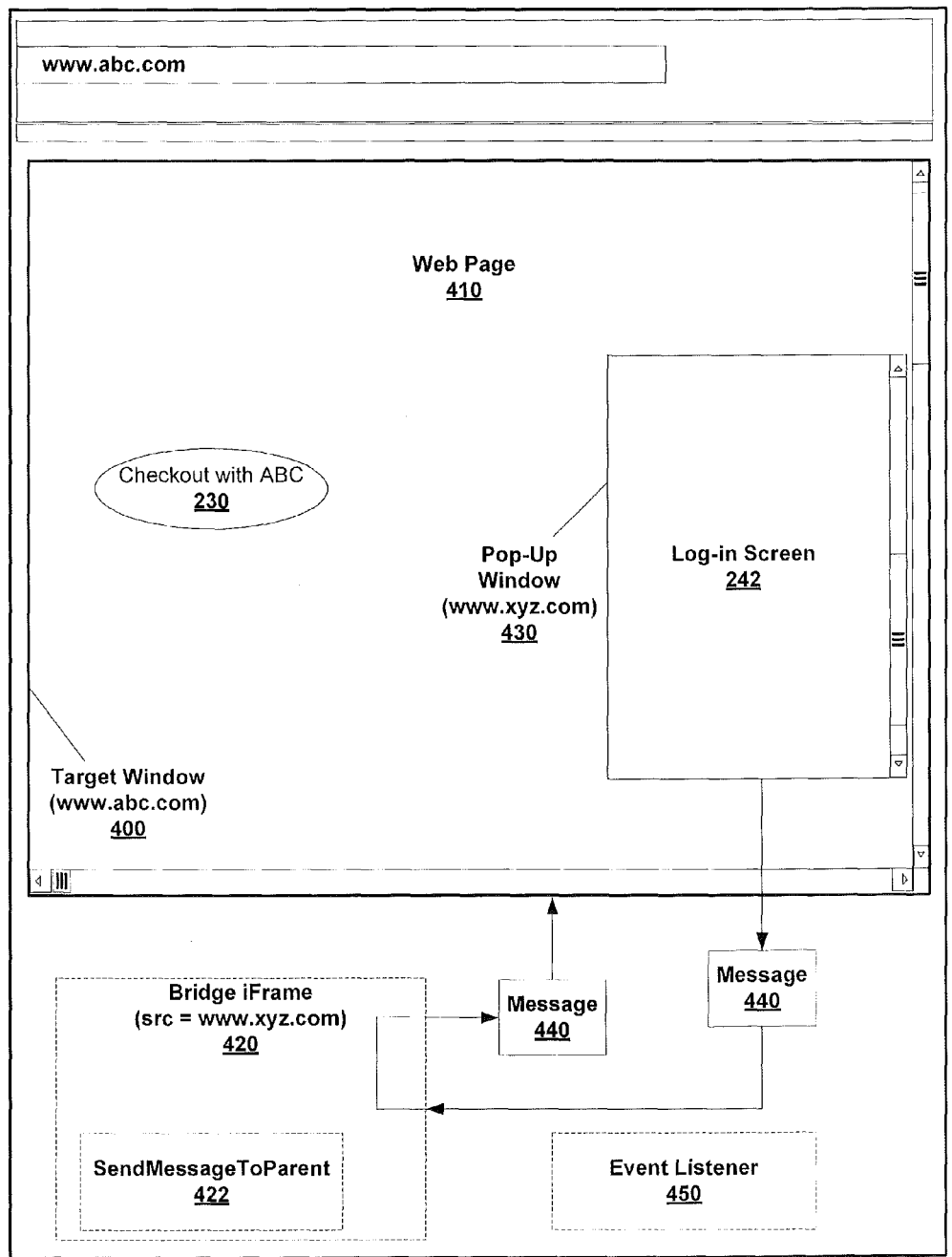
FIG. 6 is a schematic block diagram illustrating how cross-domain communications between two windows may be implemented according to certain embodiments of the present disclosure.

FIG. 6 is a schematic block diagram illustrating how cross-domain communications between two windows may be implemented according to certain embodiments of the present disclosure. As shown in FIG. 6, a first web browser window 400 is rendered on a user's display device 18. A first web page 410 having URL www.abc.com is rendered in the first window 400. In the example of FIG. 6, the first window 400 is the window that is to receive a message, and hence is also referred to as the "target" window in the description that follows.

As shown in FIG. 6, the target window 400 includes an embedded iframe 420. In this example, the iframe 420 is not visible to the user, and hence is shown using dotted lines in FIG. 6. The iframe 420 may be created, for example, by JavaScript contained within the target window 400 during the load of a web page 410 that is contained in the target window 400, or at a later time. The iframe 420 is a software browsing context that is nested within the target window 400. The iframe 420 has a source or "src" address of www.xyz.com, meaning that the content of the iframe 420 was provided from the www.xyz.com domain. The iframe 420 is referred to herein as a "bridge iframe" as it is used as a bridge to facilitate cross-domain communications between a second window 430 and the target window 400, in the manner described below. The content of the bridge iframe 420 is a JavaScript function 422 named SendMessageToParent, that is designed to take an input message and forward that message to the target window 400 using, for example, either the postMessage or URL polling techniques that are discussed above with reference to FIGS. 4 and 5 (whichever one is appropriate based on the web browser program that is used to render the windows/iframes).

As shown in FIG. 6, the target window 400 further includes an event listener 450. Event listener 450 may comprise, for example, JavaScript code that detects events such as postMessage calls. Various functions that may be performed by the event listener 450 are discussed below.

As is further shown in FIG. 6, a second web browser window 430 is also displayed on the user's display device 18. The second window 430 may comprise, for example, a pop-up window 430 that is rendered adjacent to or overlaying the window 400. The pop-up window 430 may be created by the web browser program 20 (not shown in FIG. 6, see FIGS. 1 and 3) in response to JavaScript code in the target window 400 (e.g., the target window 400 receives input from a user, such as activation of a widget, that causes JavaScript code to be executed that instructs the web browser program 20 to create pop-up window 430). In this example, the pop-up window 430 has a URL of www.xyz.com. Thus, the windows 400 and 430 are associated with different domains, and hence various web browser programs may not allow these windows 400 and 430 to communicate with each other. The bridge iframe 420 is embedded in the target window 400, which is in the www.abc.com domain, but the bridge iframe 420 is in the www.xyz.com domain (i.e., the same domain as the pop-up window 430), as the contents of the bridge iframe 420 were provided from the www.xyz.com domain.

The pop-up window 430 is a child window of the target window 400. By way of background, a "child" window (or iframe) refers to a window/iframe that is created or opened by another "parent" window, either automatically or as a result of some activity of a user who is viewing the parent window. A child window and a parent window are considered to be "related" to each other. Two child windows of the same parent window would also be related to each other (as sibling windows), and the relationships can extend across more than one or two generations (i.e., a parent and a grandchild window would be related to each other, as would two grandchild windows that have different parent windows but the same grandparent window). The existence of a relationship between windows/iframes from different domains is relevant because web browser programs generally will allow a first window to have access to all of the iframes of a second window—even if the first and second windows are from different domains—so long as the first and second windows are "related" to each other in the manner described above.

As the target window 400 and the pop-up window 430 are related to each other as parent and child, the pop-up window 430 can find and gain access to (i.e., "grab a handle to") any of the iframes of the target window 400, specifically including the bridge iframe 420, even though the target window 400 and the pop-up window 430 are in different domains.

Additionally, as the bridge iframe 420 is within the www.xyz.com domain, which is the same domain as the domain of the pop-up window 430, the pop-up window 430 can access the SendMessageToParent function 422 of the bridge iframe 420 in order to communicate with the target window 400. In particular, the pop-up window 430 can call the SendMessageToParent function 422 of the bridge iframe 420, which will pass a communication 440 from the pop-up window 430 to the target window 400.

The SendMessageToParent function 422 may be configured to forward the message 440 from the pop-up window 430 to the target window 400 using, for example, one of the above-described postMessage and URL polling techniques. As noted above, if the postMessage technique is used, the bridge iframe 420 may call a postMessage event on the target window 400. The event listener 450 at the target window 400 detects the postMessage call, and may then perform one or more security checks on the message 440 that is being forwarded from the bridge iframe 420 to determine whether or not the message 440 should be discarded or not. In particular, the event listener 450 may scan each postMessage communication to ensure that it complies with the HTML 5 specifications, and only allow complying postMessage events to occur. While the SendMessageToParent function 422 of the bridge iframe 420 and the target window 400 are associated with different domains, cross-domain communications therebetween are generally allowed under the postMessage technique as such communications comprise iframe-to-window (as opposed to window-to-window) communications.

As some web browsers do not support the postMessage technique, the target window 400 may also be set up to periodically poll its URL location for the value of the URL fragment identifier. For web browsers that do not support the postMessage technique, the bridge iframe 420 may be configured to modify the URL fragment identifier of the target window 400 so as to append the message from the pop-up window 430 thereto. Such modification to the URL is permitted as the bridge iframe 420 is related to the target window 400 (i.e., it is a child of the target window 400).

Thus, by embedding the bridge iframe 420 within the target window 400, the pop-up window 430 is provided a mechanism by which it can send a message 440 to the target window 400.

Figure 7:
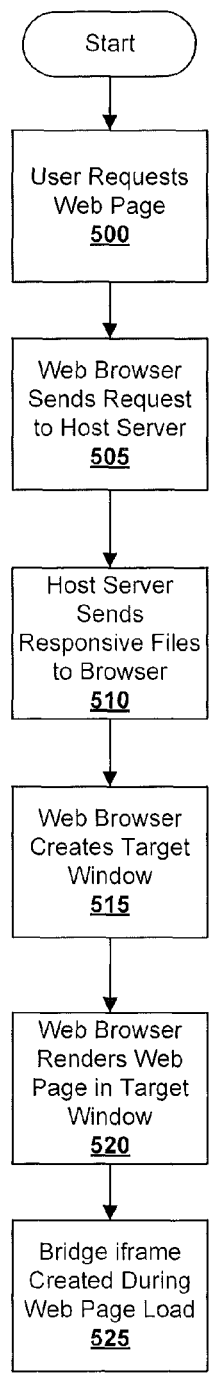
FIG. 7 is a flowchart of operations for creating a target window that facilitates certain cross-domain communications according to embodiments of the present disclosure.

FIG. 7 is a flowchart of operations for creating a target window that is designed to receive certain cross-domain communications according to embodiments of the present disclosure. As shown in FIG. 7, operations may begin with a user requesting a desired web page via a web browser program (i.e., by typing in the URL for the web page, selecting a hyperlink, etc.) (block 500). In response to this request, the web browser program sends a request to a server in a first domain that is associated with the requested web page (block 505). The server forwards one or more files to the web browser program that can be used by the web browser program to create the requested web page (block 510). The web browser program then opens a window (the "target window") on the user's display device (block 515), and renders the requested web page within the target window (block 520). The web page may have a widget or other object embedded therein that is configured to create a window or iframe such as a pop-up window that is rendered adjacent to the target window. This pop-up window may be created, for example, in response to input received from a user viewing the web page. The pop-up window (or other window or iframe) may receive content (e.g., a second web page, a log-in screen, a form, etc.) from a device (e.g., a server) that is associated with a second domain that is different than the first domain. The requested web page that is displayed in the target window also has embedded JavaScript code (or other computer program code) therein that executes, for example, during the load of the requested web page within the target window that creates a bridge iframe (block 525). The source address of the bridge iframe may be in the second domain, and the content of the bridge iframe may be the SendMessageToParent function. As discussed above, the pop-up window may use the SendMessageToParent function of the bridge iframe to communicate with the target window.

Figure 8:
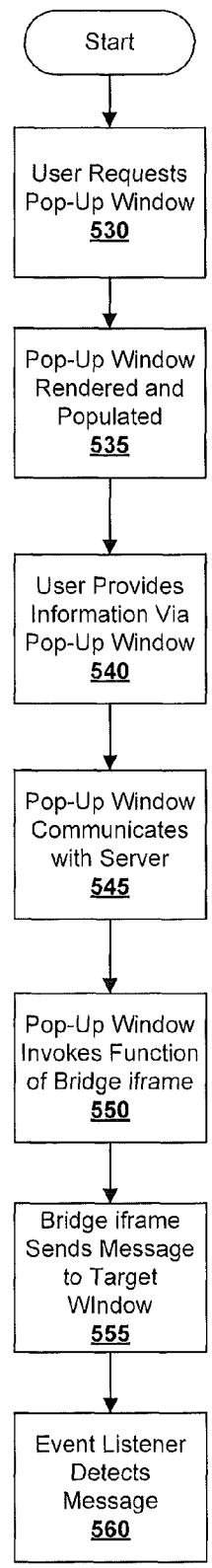
FIG. 8 is a flowchart of operations for conducting cross-domain communications between windows that are in different domains according to embodiments of the present disclosure.

FIG. 8 is a flowchart of operations for conducting cross-domain communications between windows from different domains according to embodiments of the present disclosure. The operations of FIG. 8 may be carried out, for example, after completion of the operations of the flow chart of FIG. 7.

As shown in FIG. 8, operations may begin with a user that is viewing the web page that is rendered in the target window activating a widget (or other object, icon, etc.) displayed thereon (block 530) by, for example performing a mouse click on the widget. Activation of the widget (or other object, icon, etc.) invokes a JavaScript routine that causes the web browser program to create and display a pop-up window (block 535). The pop-up window may contain content that is provided from a domain that is different than the domain that supplied the content to the target window. As an example, the pop-up window may display a web page of an entity that includes a log-in screen, and the user may log into their account with the entity using this log-in screen. The user may then interact with the entity by, for example, logging into their account with the entity and providing information to the entity (block 540). The pop-up window may convey information that is entered by the user to a remote server in the domain of the pop-up window (block 545). A number of different communications may be exchanged between the pop-up window and the remote server, and various different web pages may be displayed in the pop-up window during this exchange. Thereafter, the pop-up window may invoke the SendMessageToParent function of the bridge iframe in order to pass information and/or send a message to the target window (block 550). In response to this function call, the bridge iframe may use, for example, either the postMessage technique or URL polling to forward the information/message to the target window (block 555) using the processes described above with respect to FIGS. 4 and 5. As shown in FIG. 8, if the postMessage technique is used, an event listener in the target window may detect the message and make a determination as to whether or not the message should be provided to an event processor associated with the target window in the manner described above with respect to FIG. 5.

Figure 9:
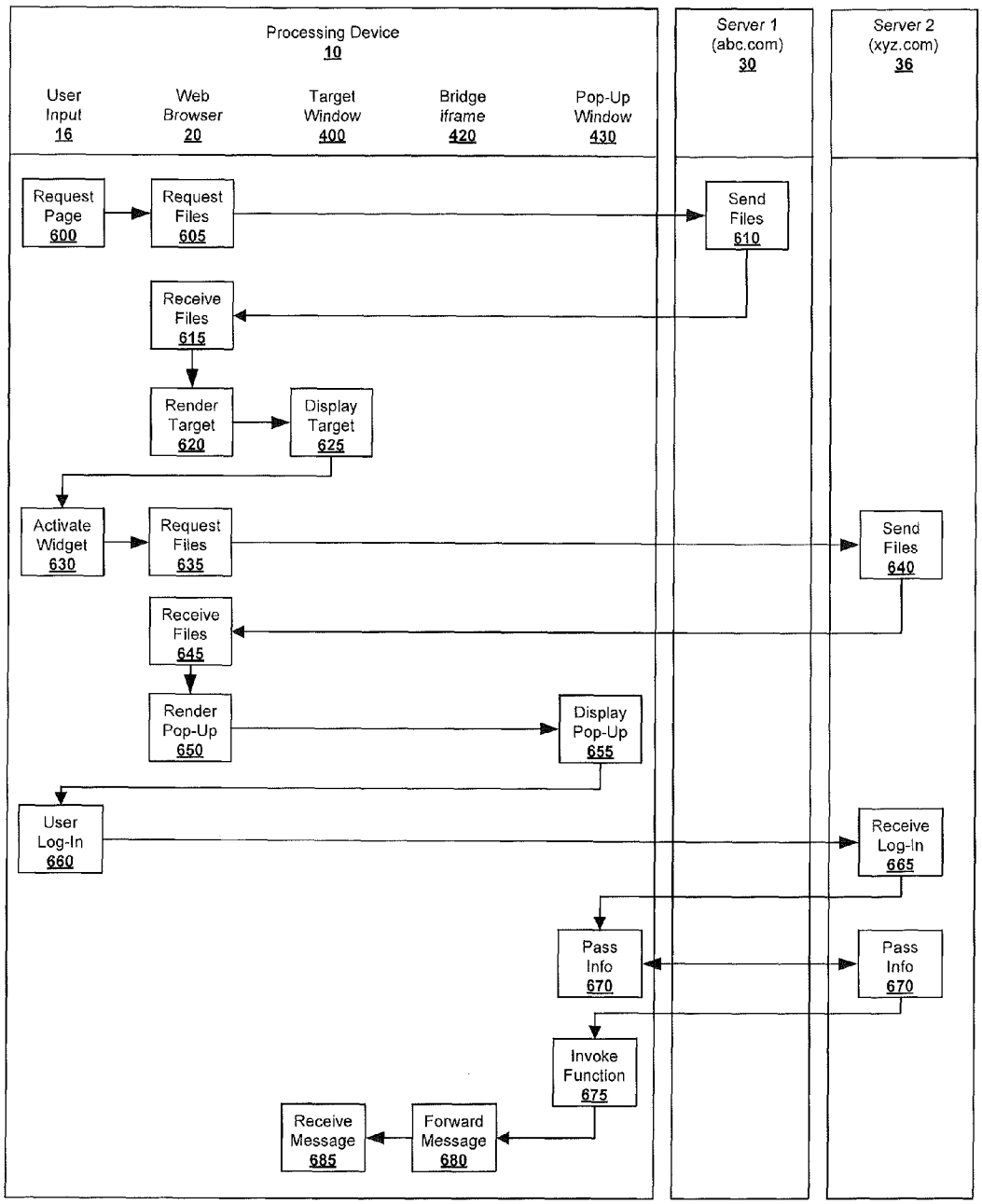
FIG. 9 is an information flow diagram that further illustrates various methods of facilitating cross-domain communications pursuant to embodiments of the present disclosure.

FIG. 9 is an information flow diagram that further illustrates various operations and/or methods of facilitating cross-domain communications pursuant to embodiments of the present disclosure. In particular, the information flow diagram of FIG. 9 shows various message and file/data transfers that may occur in order to allow the pop-up window 430 of FIG. 6 to communicate with the target window 400 of FIG. 6 after, for example, a user starts interacting with the pop-up window 430.

As shown in FIG. 9, operations may begin with a user of the processing device 10 using one or more of the user input devices 16 (see FIG. 1) to request a specific web page 410 by, for example, typing a URL into the web browser program 20 or by selecting a hyperlink (block 600). This request for the web page 410 is transferred from the user input device 16 to the web browser program 20 that is operating on processing device 10. Upon receiving this request, the web browser program 20 contacts a server that is identified in the input URL to request the files necessary to generate the requested web page (block 605). In this particular example, the server is a remote server 30 (see FIG. 3) that is in the www.abc.com domain 32. In response to the request 605, the server 30 returns one or more files such as HTML files to the web browser 20 that may be used to create the requested web page 410 (block 610).

The web browser program 20 creates the target window 400 in which the requested web page 410 will be displayed. The web browser program 20 receives the requested files (block 615), and uses these files to create the requested web page 410 (block 620), and the displays the requested web page 410 within the target window 400 (block 625). As discussed above with respect to FIG. 6, the web page 410 includes a widget 230 that the user may activate in order to, for example, log-in to a website and/or account of another entity that is associated with another remote server (namely server 36 of FIG. 3, which is in the www.xyz.com domain 38).

The user activates the widget 230 by, for example, pointing at the widget 230 using a mouse and then clicking the left button of the mouse (block 630). A JavaScript routine that is associated with the widget 230 is executed in response to this mouse click. Execution of this JavaScript routine causes the web browser 20 to request files from the remote server 36 in the www.xyz.com domain that will be used to populate a pop-up window 430 that will be created over top of the target window 400 (block 635). In response, the remote server 36 sends the requested files to the web browser program 20 (block 640). The web browser program 20 receives the files (block 645), and then creates the pop-up window 430 (block 650) and uses the received files to render the requested web page 242 within the pop-up window 430 (block 655). In this particular example, the web page 242 comprises a log-in screen for a website in the domain 38.

The user may use the input devices 16 to input log-in information into the log-in screen (block 660), thereby logging into their account so that a customer service session is initiated (block 665). The pop-up window 430 may pass information back to the remote server 36 in the www.xyz.com domain, and various information may be exchanged between the pop-up window and the remote server 36 (blocks 670). The interaction/information exchange between the pop-up window 430 and the remote server 36 may include passing additional web pages to the pop-up window 430 (not shown in FIG. 9) that are displayed in the pop-up window 430. Thereafter, the pop-up window 430 may need to to send a message to the target window 400 such as, for example, an instruction to close the target window 400 or an iframe thereof or transfer of address information in our example). In some cases, the remote server 36 may instruct the pop-up window 430 to send the message to the target window 400. When such a need to send a message arises, JavaScript code within the pop-up window 430 invokes the SendMessageToParent function 422 of the bridge iframe 420 (block 675). In response to the call of this function 422, the bridge iframe 420 forwards the message from the pop-up window 430 to the target window 400 using either (1) the postMessage technique or (2) URL polling, as appropriate (block 680) so that the message is received at the target window (block 685). An event listener may monitor for any postMessage calls in the manner discussed above (not shown in FIG. 9).

As shown above, the techniques according to embodiments of the present disclosure may facilitate secure window-to-window and/or iframe-to-window cross-domain communications across various web browser programs. Embodiments of the present disclosure take advantage of the fact that web browser programs generally allow a sender window (e.g., the pop-up window 430) to have access to the iframes within a target window (e.g., target window 400), even if the sender pop-up window 430 and the target window 400 are in different domains, so long as the sender window and the target window are related to each other. Thus, as the pop-up window 430 is a child of the target window 400, the pop-up window 430 is permitted access to the iframes within the target window 400, specifically including the bridge iframe 420, even though the pop-up window 430 and the target window 400 are associated with different domains Because the pop-up window 430 is permitted access to the iframes of the target window 400, the pop-up window 430 can grab a handle to the bridge iframe 420.

Embodiments of the present invention also take advantage of the fact that direct iframe-to-window and window-to-window communications are generally allowed by web browser programs so long as both the sending iframe/window and the target window are from the same domain. As such, the pop-up window 430 can access the SendMessageToParent function 422 of the bridge iframe 420 as the pop-up window 430 and the function 422 of the bridge iframe 420 share a common domain. The SendMessageToParent function 422 of the bridge iframe 420 may use, for example, the postMessage or URL polling techniques to forward a message from the pop-up window 430 that is contained in the function call to the target window 400.

Thus, pursuant to embodiments of the present disclosure, documents (e.g., web pages, forms, etc.) that are from different domains can communicate with each other, without exposing the documents to hostile cross-site scripting attacks.

Figure 10:
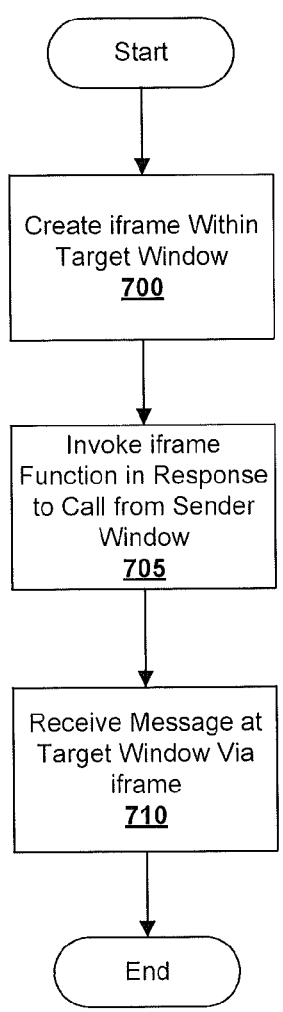
FIG. 10 is a flowchart of operations for a sender window that is in a first domain to communicate with a target window that is in a second, different domain according to further embodiments of the present disclosure.

FIG. 10 is a flowchart of operations for a sender window that is within a first domain to communicate with a target window that is within a second, different domain according to further embodiments of the present disclosure. As shown in FIG. 10, operations may begin with the target window creating an embedded iframe that has a source address that is within the first domain (i.e., in the domain of the sender window) (block 700). Next, a function of the embedded iframe may be invoked in response to a function call from the sender window (block 705). A message may thereafter be received at the target window in response to the invocation of the function of the iframe that is passed from the sender window to the target window via the iframe (block 710). The sender window may be a child window of the target window.

In some embodiments, the sender window may be a pop-up window. In some embodiments, the message may be received at the target window after the iframe makes a postMessage call on the target window or after the iframe appends the message to the URL of the target window.

Figure 11:
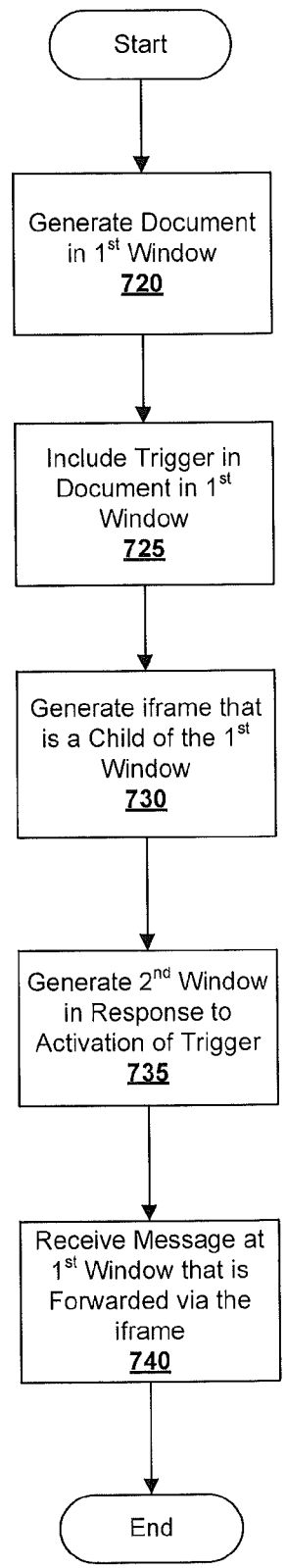
FIG. 11 is a flow chart of operations for conducting cross-domain communications according to further embodiments of the present disclosure.

FIG. 11 is a flow chart of operations for conducting cross-domain communications according to further embodiments of the present disclosure. As shown in FIG. 11, operations may begin with a document being generated and loaded into a first web browser window that is in a first domain (block 720). The document may comprise, for example, a web page, a form, a media element, etc. The loaded document may include a trigger (block 725), where a trigger refers to an object or other element that a user may select or activate to cause a responsive action. In some embodiments, the trigger may comprise a user-activated widget. An iframe that is a child of the first web browser window and that is in a second, different domain is also generated (block 730). The user-activated widget, when activated by a user, executes computer program code such as JavaScript that causes a second web browser window to be created and populated (block 735). This second web browser window may be related to the first web browser window, and may be in the second domain. Thereafter, a message may be received at the first web browser window that is forwarded from the second web browser window to the first web browser window via the iframe (block 740).

Figures 12, 13:
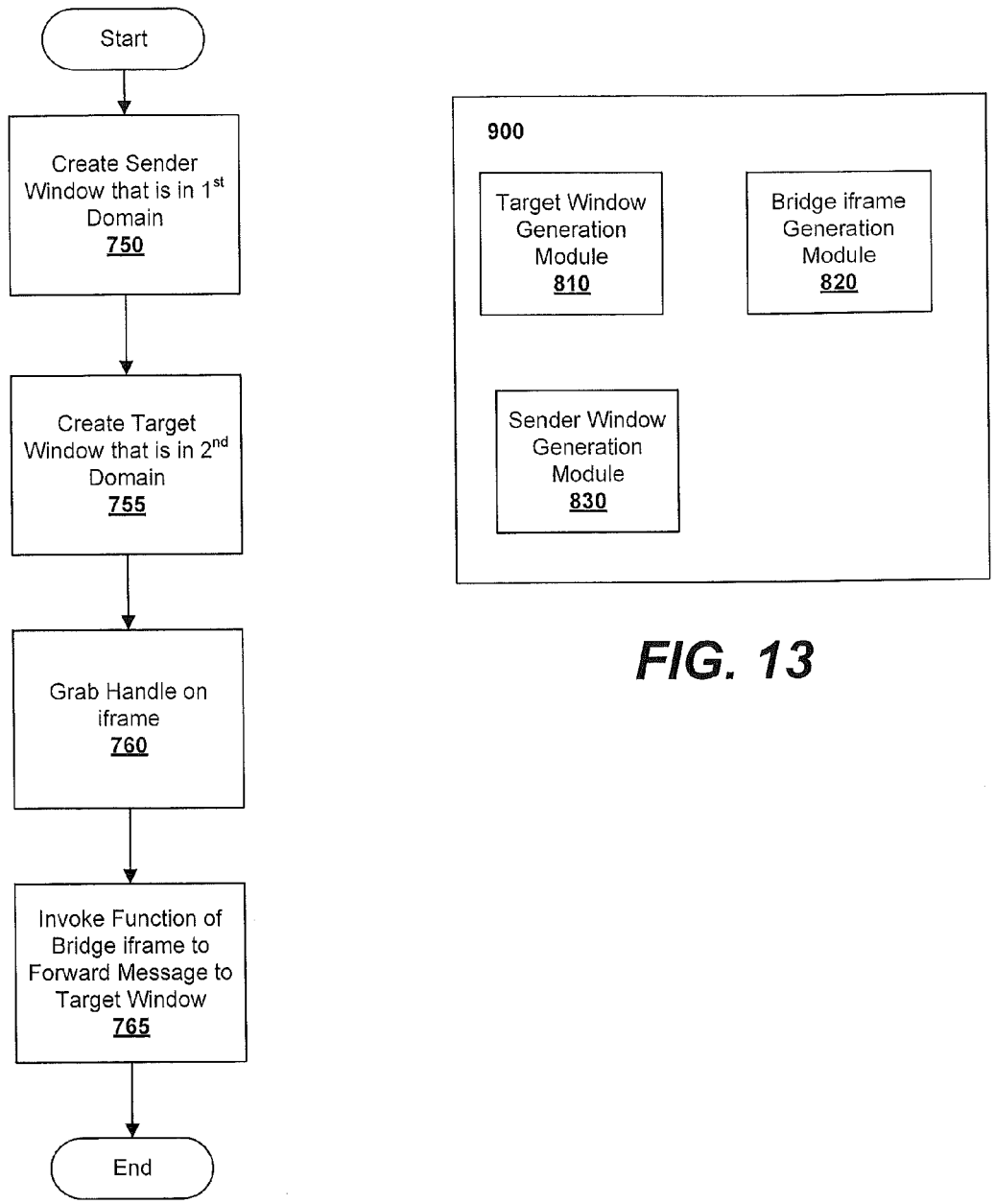
FIG. 12 is a flow chart of operations for conducting cross-domain communications according to yet additional embodiments of the present disclosure.
FIG. 13 is a block diagram of a system for generating a target web browser window that is in a first domain that is configured to receive communications from a sender web browser window that is in a second, different domain according to embodiments of the present disclosure.

FIG. 12 is a flow chart of operations for a sender web browser window that is in a first domain to communicate with a target web browser window that is in a second, different domain according to further embodiments of the present disclosure. As shown in FIG. 12, operations may begin with the creation of the target web browser window that is in the second domain (block 750) and the creation of the sender web browser window that is in the first domain (block 755). During the creation of the target web browser window (which is in the second domain), an embedded bridge iframe may be created that is in the first domain. Thereafter, the sender web browser window may grab a handle to the bridge iframe (block 760). Once the sender web browser window has the handle to the bridge iframe, it may invoke a function of the bridge iframe in order to forward a message to the target web browser window from the sender web browser window via the bridge iframe (block 765). The iframe and the sender web browser window may each be a child of the target web browser window. The function of the iframe may use, for example, the postMessage technique or the URP polling technique to forward the message to the target web browser window.

FIG. 13 is a block diagram of a system 800 for generating a target web browser window that is in a first domain that is configured to receive communications from a sender web browser window that is in a second, different domain according to embodiments of the present disclosure. As shown in FIG. 13, the system includes a first module 810 that is configured to generate the target web browser window, the target web browser window including a user-activated object therein (e.g., a widget). The system further includes a second module 820 that is configured to generate a bridge iframe that is embedded in the target web browser window and that is a child of the target web browser window, the bridge iframe being in a second domain that is different from the first domain. The system also includes a third module 830 that is configured to generate a sender web browser window (e.g., a pop-up window) that is a child of the target web browser window in response to activation of the user-activated object, the sender web browser window also being in the second domain. In some embodiments, the second module 820 is configured to generate the bridge iframe to have as its content a function that is configured to forward a message received from the sender window to the target window using, for example, the postMessage technique or the URP polling. It will be appreciated that the modules 810, 820, 830 may be implemented separately or may be combined together.

While certain embodiments of the present invention have been described above, it will be appreciated that numerous modifications may be made to the described embodiments without departing from the scope of the present disclosure. As one example, it will be appreciated that the techniques of the present disclosure may be used to pass any message or information from a sender window that is in one domain to a target window that is in another domain. Thus, it will be appreciated that the above examples are simply exemplary in nature.

Herein, references are made to "using a computer" to perform various operations. It will be appreciated that the computer may any type of electronic processing element such as, for example, a microprocessor of a server, a general purpose computer or special purpose computer, a microcontroller, a digital signal processor, firmware, or any other computer processing device and may be standalone and/or connected by a wired and/or wireless, real and/or virtual, public and/or private network to additional computers. The network(s) discussed herein may be any public and/or private, virtual and/or real, wired and/or wireless network or combination of networks, specifically including the Internet.

While various embodiments have been described above, it will be appreciated that the disclosed embodiments are not intended to be limiting, and are only provided by way of example, and that the present application covers all modifications, equivalents, and alternatives falling within the spirit and scope of the claims appended hereto.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, operations, elements, and/or devices, but do not preclude the presence or addition of one or more other features, operations, elements, devices, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items.

It will be understood that, although the terms first, second, etc. may be used herein to describe various elements, these terms are only used to distinguish one element from another and are not limiting. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It will be understood that a block of the block diagrams and/or flowchart illustrations, and combinations of blocks in the block diagrams and/or flowchart illustrations, can be implemented by computer program instructions that are performed by one or more computer processing devices. These computer program instructions may be provided to a processor circuit of a general purpose computer circuit, special purpose computer circuit, and/or other programmable data processing circuit to produce a machine and/or a computer-implemented process, such that the instructions, which execute via the processor of the computer and/or other programmable data processing apparatus, transform and control transistors, values stored in memory locations, and/or other hardware components within such circuitry to implement the functions/acts specified in the block diagrams and/or flowchart block or blocks, and thereby create means (functionality) and/or structure for implementing the functions/acts specified in the block diagrams and/or flowchart block(s). Accordingly, embodiments according to the present disclosure may be embodied in hardware and/or in software (including firmware, resident software, micro-code, etc.) that runs on a processor such as a digital signal processor, which may collectively be referred to as "circuitry," "a module" or variants thereof.

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

Tangible, non-transitory computer-readable mediums that may be used may include, for example an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated and/or blocks may be omitted in some circumstances.

Various different embodiments have been disclosed above in connection with the description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A computer-implemented method for conducting cross-domain communications, the computer-implemented method comprising:
    generating, via a computing device, a document within a first web browser window that is associated with a first domain, the document associated with a first entity and including functionality for performing a checkout transaction with the first entity, the document including a display element that is selectable by a user to initiate a payment process using an account with a second entity;
    generating, via the computing device, an iframe that is a child of the first web browser window, wherein the iframe is associated with a second domain different from the first domain and the iframe is configured to relay a message between the first web browser window and a second web browser window via a function call that transfers the message between the first web browser window and the second web browser window;
    generating, via the computing device, the second web browser window in response to user selection of the display element, the second web browser window being associated with the second domain and second entity, the second web browser window providing functionality for the user to use the account with the second entity to make a payment in support of the checkout transaction; and
    relaying, via the computing device, the message from the second web browser window to the first web browser window via the iframe.

2. The computer-implemented method of claim 1, wherein the message includes address information specified by the user via the second web browser window as part of the payment process.

3. The computer-implemented method of claim 1, further comprising generating an event listener in the first web browser window that listens for a postMessage communication from the iframe.

4. A computer-implemented method for a first web browser window that is associated with a first domain to receive a message from a second web browser window that is associated with a second domain different from the first domain, the computer-implemented method comprising:
    displaying a checkout in the first web browser window on a computing device, said checkout page associated with the first domain and providing functionality for making a purchase;
    concurrently with the display of the checkout page, providing, in the second web browser window on the computing device, an interface that includes functionality for a user to perform a payment transaction in support of the purchase using an account with a second entity, the interface associated with the second domain;
    creating, via the computing device, an iframe that is embedded in the first web browser window that has a source address that is associated with the second domain, wherein the iframe is configured to relay the message from the second web browser window to the first web browser window;
    invoking, via the computing device, a function of the iframe in response to a function call from the second web browser window to pass the message via a memory of the computing device from the second web browser window to the first web browser window; and
    receiving, via the computing device, the message from the second web browser window at the first web browser window in response to invocation of the function of the iframe, the message associated with the payment transaction.

5. The computer-implemented method of claim 4, wherein receiving the message from the second web browser window at the first web browser window in response to invocation of the function of the iframe comprises sending the message from the iframe to the first web browser window using a postMessage call.

6. The computer-implemented method of claim 4, wherein receiving the message from the second web browser window at the first web browser window in response to invocation of the function of the iframe comprises:
polling a uniform resource locator ("URL") of the first web browser window; and
extracting the message, wherein the message is appended to the URL of the first web browser window.

7. The computer-implemented method of claim 4, wherein the function comprises computer code that receives the message from the second web browser window and in response to receiving the message forwards the message to the first web browser window.

8. The computer-implemented method of claim 4, wherein the second web browser window comprises a pop-up window.

9. The computer-implemented method of claim 8, wherein the pop-up window is a child web browser window of the first web browser window.

10. The computer-implemented method of claim 9, wherein creating the iframe that is embedded in the first web browser window comprises executing computer code that creates the iframe as a child iframe of the first web browser window.

11. The computer-implemented method of claim 4, further comprising generating an event listener in the first web browser window that listens for a postMessage communication from the iframe.

12. A computer program product for presenting via a presentation device a first web browser window that is associated with a first domain and presenting via the presentation device a second web browser window that is associated with a second domain that is different from the first domain such that the second web browser window can engage in cross-domain communications with the first web browser window, the computer program product comprising:
a non-transitory computer-readable medium having executable computer-readable program code therein, the computer-readable program code including:
computer program code that, when executed by a computing device, is configured to generate the first web browser window, the first web browser window having an embedded iframe that is associated with the second domain, wherein content of the embedded iframe includes computer program code that, when executed by the computing device, is configured to forward a message to the first web browser window from the second web browser window, wherein the first web browser window displays a checkout page of a first entity and provides functionality for performing a checkout transaction, the checkout page associated with the first domain;
computer program code that, when executed by the computing device, is configured to generate the second web browser window, wherein the second web browser window is a child window of the first web browser window, wherein the second web browser window displays an interface that includes functionality for a user to use an account with a second entity to make a payment in support of the checkout transaction, the interface associated with the second domain; and
computer program code that, when executed by the computing device, is configured to invoke a function of the embedded iframe in order to forward the message from the second web browser window to the first web browser window via the embedded iframe.

13. The computer program product of claim 12, wherein the message comprises information associated with the checkout transaction, said information provided by the second web browser window.

14. The computer program product of claim 12, wherein the computer program code that is configured to forward the message to the first web browser window comprises computer program code that is configured to call a postMessage event on the first web browser window from the embedded iframe.

15. The computer program product of claim 12, wherein the computer program code that is configured to forward the message to the first web browser window comprises computer program code that is configured to:
poll a URL of the first web browser window; and
extract the message from the URL of the first web browser window in response to determining that the URL of the first web browser window was modified.

16. The computer-implemented method of claim 1, wherein the iframe specifies a source address within the second domain.

17. The computer-implemented method of claim 1, wherein the first entity comprises an online merchant and the second entity comprises a payment service provider.

18. The computer-implemented method of claim 1, wherein the second web browser window displays a log-in interface that includes functionality for logging into the account with the second entity.

19. The computer-implemented method of claim 1, wherein the second web browser window is a pop-up window.

20. The computer-implemented method of claim 1, wherein the message causes an iframe of the first web browser window to close.

21. The computer-implemented method of claim 4, wherein the message conveys to the first web browser window address information specified by the user via the second web browser window.

22. The computer-implemented method of claim 4, wherein the message causes the first web browser window, or an iframe thereof, to become closed.

23. The computer-implemented method of claim 4, wherein the second web browser window displays a log-in interface that includes functionality for logging into the account with the second entity.

24. The computer program product of claim 12, wherein the interface includes functionality for logging into the account with the second entity.

25. The computer program product of claim 12, wherein the message conveys to the first web browser window address information specified by the user via the second web browser window.

26. The computer program product of claim 12, wherein the message causes the first web browser window, or an iframe thereof, to become closed.

27. The computer program product of claim 12, wherein the checkout page includes an element that is selectable by the user to cause the second web browser window to be opened.

* * * * *

UNITED STATES PATENT AND TRADEMARK OFFICE
CERTIFICATE OF CORRECTION

PATENT NO. : 9,037,963 B1
APPLICATION NO. : 13/092695
DATED : May 19, 2015
INVENTOR(S) : Hendi Chandi et al.

Page 1 of 1

It is certified that error appears in the above-identified patent and that said Letters Patent is hereby corrected as shown below:

In the specification,

In column 12 at line 28, change "domains" to --domains.--.

In the claims,

In column 16 at line 45, after "checkout" insert --page of a first entity--.

Signed and Sealed this
Fifteenth Day of March, 2016

Michelle K. Lee
*Director of the United States Patent and Trademark Office*